Figure 17:
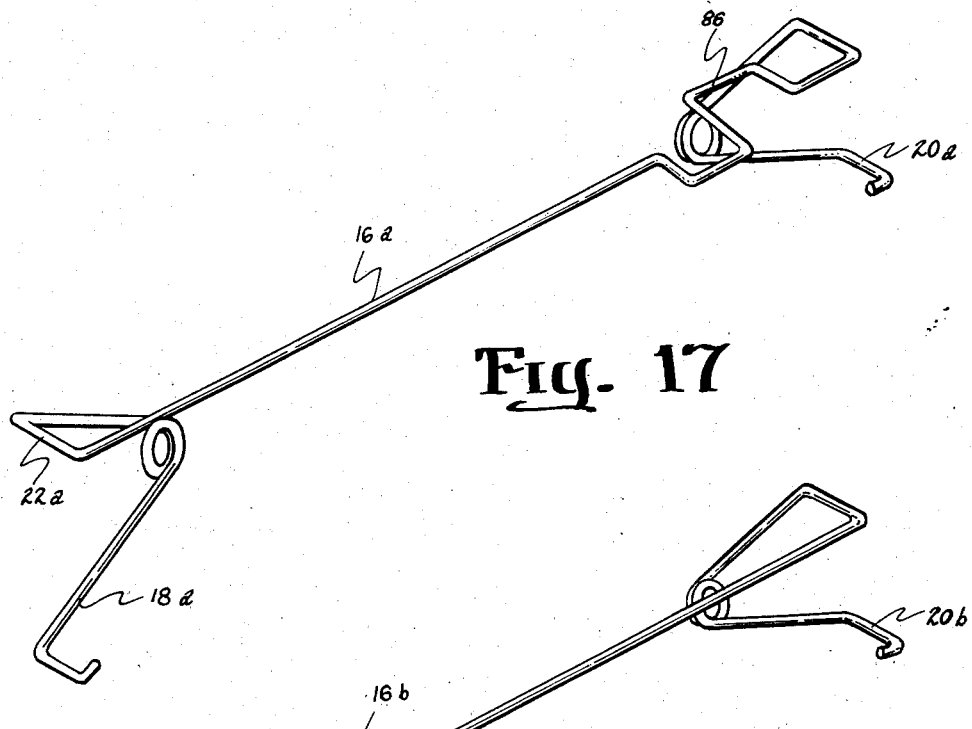

Feb. 3, 1959   M. STUBNITZ ET AL   2,871,922
VEHICLE CUSHION CONSTRUCTION
Filed Jan. 26, 1956   4 Sheets-Sheet 1
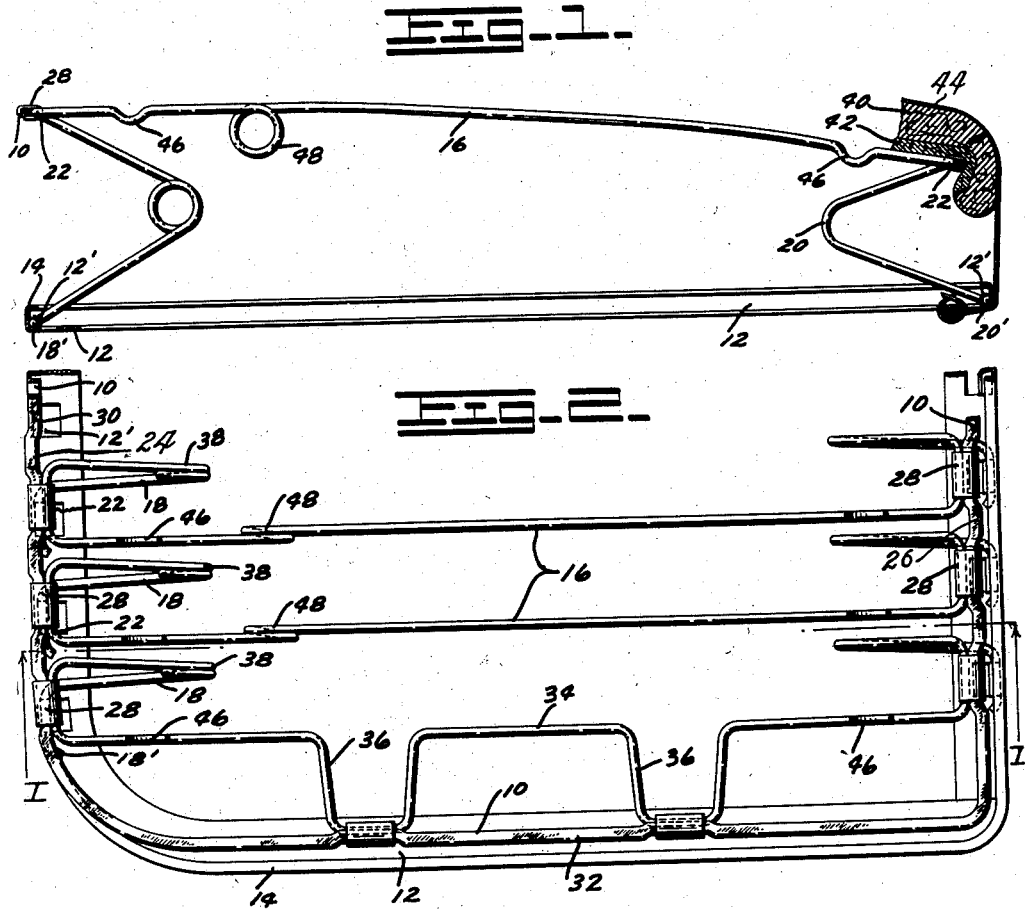
INVENTOR
Maurice Stubnitz
Lewis J. Stern
BY
ATTORNEY

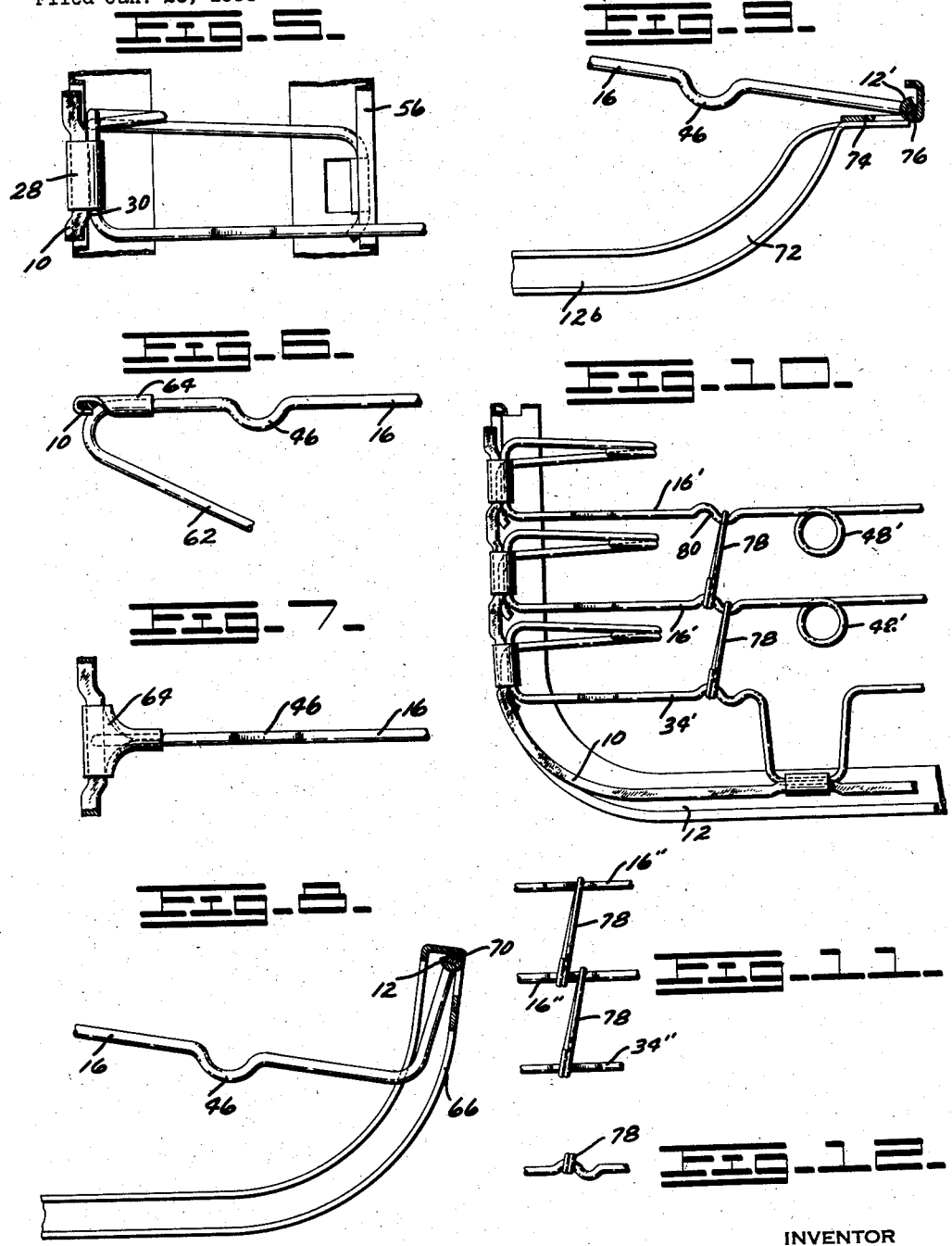

Feb. 3, 1959  M. STUBNITZ ET AL  2,871,922
VEHICLE CUSHION CONSTRUCTION
Filed Jan. 26, 1956  4 Sheets-Sheet 3
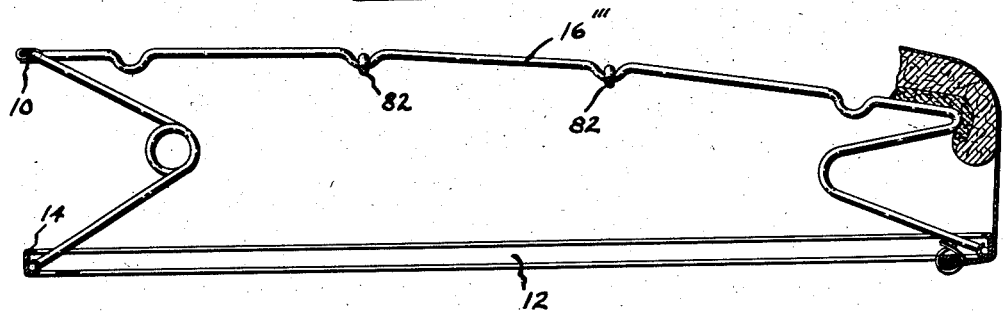
Fig. 13.
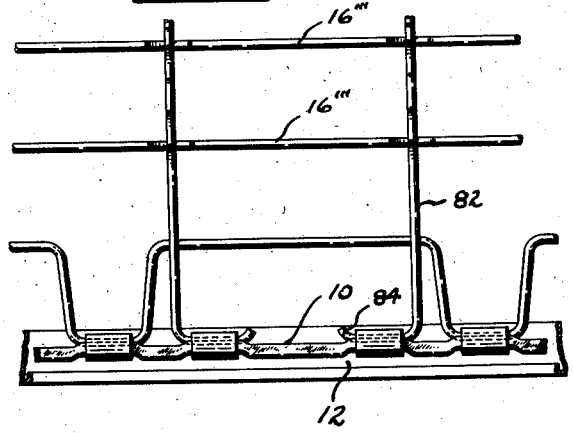
Fig. 14.
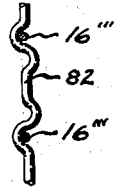
Fig. 15.
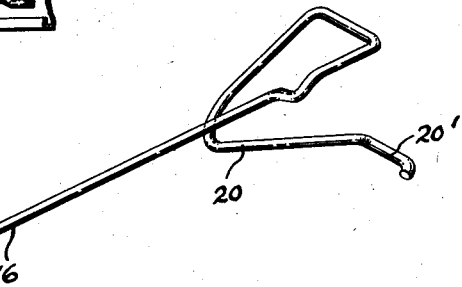
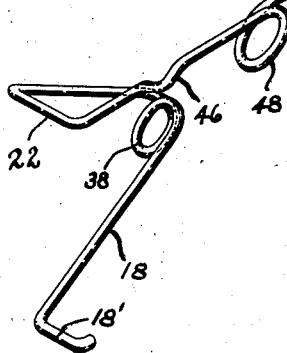
Fig. 16.
INVENTOR
Maurice Stubnitz
Lewis J. Starn
BY
ATTORNEY Feb. 3, 1959　　M. STUBNITZ ET AL　　2,871,922
VEHICLE CUSHION CONSTRUCTION Filed Jan. 26, 1956　　　　　　　　　　　　　　　　4 Sheets-Sheet 4

INVENTOR
Maurice Stubnitz
Lewis J. Stern
BY
ATTORNEY

United States Patent Office 2,871,922
Patented Feb. 3, 1959

2,871,922

VEHICLE CUSHION CONSTRUCTION

Maurice Stubnitz and Lewis J. Stern, Adrian, Mich., assignors to Stubnitz Greene Corporation, Adrian, Mich., a corporation of Michigan Application January 26, 1956, Serial No. 561,470

2 Claims. (Cl. 155—179)

The present invention relates to spring cushion seat and back construction particularly designed for use in vehicles, although suitable for furniture and the like as well.

Present day trend in vehicle design coupled with increases in labor and material has resulted in a demand for thinner cushions capable of being economically made yet characterized by good riding qualities and durability in service.

It is the purpose of the present invention to satisfy the aforesaid demands of the trade through the design and novel arrangement of an improved spring element and associated structure which will reduce to a minimum the amount of spring wire used in the cushion construction without material sacrifice of riding qualities. We consider our invention to be an improvement over the spring elements disclosed in the Stubnitz Patent No. 2,649,897 and the Reed Patent No. 2,265,251.

To reduce cost of construction, coil springs once exclusively used in vehicle seat and back cushion construction have been gradually replaced by so-called zig-zag or sinuous spring elements supported in the construction as arched elements collectively defining the load supporting surface to be trimmed to provide the finished cushion. To provide a cushion with the desired riding qualities such spring elements have been modified in form along their length to vary the resistance to deflection. The sinuous design of the spring element and its modification to provide desired resiliency results in the employment of more spring wire to fabricate a cushion unit that is required in the fabrication of a comparable cushion according to the present invention.

In the application of the principles to the invention to vehicle seats and backs, we proposed to fabricate the supporting spring structure from a plurality of longitudinal spring elements disposed in parallel arrangement with opposite ends secured in a frame, the elements being generally of straight wire form through the main span of the elements. Between the main span of the element (at one or both ends) and the frame, the wire is formed to provide the desired characteristics of riding qualities and lateral stability. Also within the main span of the element localized portions are modified from the straight form to vary the resistance to loading.

Thus, an object of the invention is to provide a relatively thin and inexpensive spring cushion construction fabricated from spring elements of reduced wire length as compared with similar type elements previously used.

Another object is to provide an improved spring cushion construction for vehicles which lends itself to be fabricated as a part of the seat frame, may be readily trimmed, and provides adequate support of the insulating surface for the upholstery padding, with a minimum use of spring wire.

A further object is to provide a spring cushion construction in which the upholstery is disposed directly upon a resilient surface defined by a plurality of stringer wires having terminal jack springs.

A still further object of the invention is to provide a spring cushion construction in which the upholstery is directly disposed upon a resilient surface defined by parallel arranged stringer wires having local deformation to vary the resistance to deflection along the stringer with integral terminal jack springs.

A still further object resides in a novel seat or back cushion construction in which the resilient supporting surface for the upholstery is defined by a plurality of stringer wires having terminal attachment with upper or outer border frame with terminal jacks integral with the stringer wire giving spaced support between said border frame and a lower or rear border frame.

These and other objects and advantages residing in the construction, arrangement and combination of component parts will more fully appear from the following specification and the accompanying claims.

In the drawings we have shown the invention as applied to a type of spring cushion in current use upon automotive vehicles as well as numerous modifications as to form of the stringer wires to vary local resistance to deflection, arrangements for attaching the stringer wires on the seat or back frame structure, and details of construction.

Figure 18:
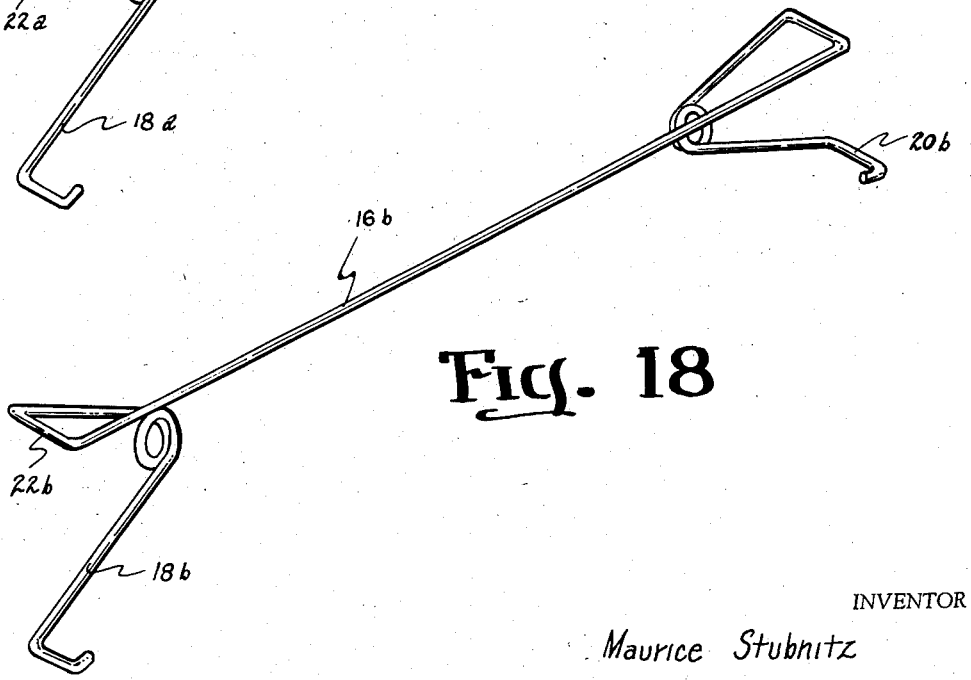

Fig. 1 is a sectional view taken on line I—I of Fig. 2 of a vehicle seat construction embodying the invention, Fig. 2 is a fragmentary plan view of the seat construction of Fig. 1, Fig. 3 is a detailed elevation of a modified form of end supporting element for stringer wire, Fig. 4 is a view similar to Fig. 3 of another form of end supporting element, Fig. 5 is a plan view of Fig. 4, Fig. 6 is a view similar to Fig. 3 of a further form of end supporting element, Fig. 7 is a plan view of Fig. 6, Fig. 8 is a detailed elevation of a modified form of connection between the seat frame and one end of the stringer wire, Fig. 9 is a view similar to Fig. 8, Fig. 10 is a fragmentary plan view similar to Fig. 2 of one form of link ties for a modified form of stringer wires, Fig. 11 is a plan view similar to Fig. 10 of a link tie on a further modified form of stringer wires, Fig. 12 is an elevational view of Fig. 11, Fig. 13 is a view similar to Fig. 1 taken on line XIII—XIII of Fig. 14 of a modified stringer wire to accommodate transverse support wires, Fig. 14 is a view similar to Fig. 2 of a modification, Fig. 15 is an elevational detailed view of one form of transverse support wire, and Figs. 16, 17 and 18 are perspective views of typical stringer wires and end supporting element portions shown removed from the seat construction.

Referring to the illustrated forms of the invention it is to be understood that the principles of construction have equal application to either the seat or back cushion. Also, it is to be understood that while the spring cushion constructions, according to the invention, have general use, they have been particularly designed to meet the demands of the vehicle industries.

In Figs. 2 and 3 a spring seat construction is sufficiently illustrated to enable those skilled in the art to adapt the principles of the invention to the various types of spring cushion now in use. The seat comprises an upper and lower generally rectangular border frame 10 and 12. In practice, for use in vehicles, the frame will usually be of flat resilient wire disposed as shown to give maximum resistance to deflection in a generally longitudinal plane. The frame 12 is preferably of sheet metal rolled into a generally L-shape with the edges 14 of the vertical leg inwardly turned to increase the rigidity of the frame 12.

Frame 10 is held in space resilient supported relation to the frame 12 through the employment of a plurality of parallel arranged stringer wires 16 having, at opposed ends, supporting elements 18 and 20 which are preferably integrally formed with the stringer wires 16. As more clearly shown in Fig. 2 the connection between the wires 16 and frame 10 is through the integrally turned portions 22 common to the wires 16 and supporting elements 18 and 20 and extending parallel to the front and rear portions 24 and 26 to be attached to the portions 24 and 26 by sheet metal clips 28. To prevent the clips 28 from shifting along the portions 24 and 26 of the frame 10, slight offsets 30 may be provided along the portions 24 and 26 about which the clips 28 are wrapped.

Referring to Fig. 2, it will be understood that the stringer wire 16, spaced inward from each side portion 32 of the frame 10, will be similar in form and extend across the entire length of the cushion. However, at each end of the cushion a specially formed stringer wire 34 is provided with opposite U-portion 36.

The end supporting elements 18 and 20 for the stringer wires 16 and 34 are in the form of jack springs. In the illustrated form of Figs. 1 and 2 the elements 18 each have a coil at 38 to give increased resiliency while the elements 20 are plain. The lower ends 18' and 20' of each element 18 and 20 is turned to run parallel to the front and rear portion of the frame 12. To attach the turned ends 18' and 20' to the frame 12, tongues 12' may be lanced from the frame 12 and bent around the ends 18' and 20' as shown in Figs. 1 and 2.

It will be readily appreciated from the location of the upholstery padding 40, breaker pad or insulator 42, and upholstery cover 44, fragmentarily shown in Fig. 2 at the right hand end, that the stringer wires 16 and 34 and frame 10 constitute a deflectable load supporting surface upon which the upholstery is directly supported. To provide areas from front to back of the cushion with varying amount of resistance to deflection, wire stock may be added to the stringer wires 16 and 34 in the form of offsets 46, loops 48 and other shapes and forms. For maximum stiffness the stringer wires 16 will be relatively straight between the front and rear portions 24 and 26 of the frame 10. To soften the cushion at the desired areas it is only necessary to add wire stock in the form of offsets, loops or the like as shown.

In the modification of Fig. 3 the stringer wire 16 is shown with an integral end support 50 which may be used at the front or rear, or both ends, of each stringer wire 16. Support 50 is shown of U-form having an upper portion 52 parallel to the frame 10 and corresponding to the portion 22 of Figs. 1 and 2 and a lower portion 54 corresponding to the portions 18' and 20' of Figs. 1 and 2 and attached to longitudinally extending frame member 56 supported by and extending lengthwise of the frame 12.

Referring to Figs. 4 and 5, a slight modification of Fig. 3 is shown in which the supporting element 58 is similar to the element 50 except for the provision of the loop 60 to increase the resiliency of support.

The modification of Figs. 6 and 7 shows the supporting end element 62 for the stringer wire 16 in the form of a straight, integral wire disposed in the same plane as the wire 16. A specially formed T-shaped clip 64 is shown for the attachment of the wire 16 to the frame 10. The lower end of the wire 62 may be attached to the frame 12 in the manner of the form shown in Figs. 3 to 5, inclusive.

Fig. 8 shows a modified arrangement of the upper border frame of the spring cushion in which it is only supported in spaced relation to the lower border frame at the front and ends of the cushion with the upper border frame and stringer wires being supported directly from the lower border frame at the rear of the construction. This is accomplished by forming the rear side of the lower border frame 12a, as at 66, upwardly to enable the stringer wires 16 to be supported therefrom through the integral extension portions 68 having a portion 70 disposed parallel to the frame 12a and engaged by the embracing frame portion 12'. With this arrangement upon deflection of the stringer wire 16, a pivotal action will take place about the axis of the portion 70.

In Fig. 9 the construction of Fig. 8 has been slightly modified. The lower border frame 12b extends only along the front and ends of the construction. At the rear of the construction the frame 12b is formed upwardly at 72 at both ends and a separate L-frame member 74 is provided parallel to the front of the frame 12b. The stringer wires 16 are shown directly supported on the border member 74 by the integral parallel portion 76 embraced by the frame portion 12'. It will be understood that at the front of the cushion construction the stringer wires 16 of Figs. 8 and 9 will be supported by the equivalent of the upper border frame 10 of Fig. 1 and plain or coiled jack springs such as 38 and 58 of Figs. 1 and 4 or 50 and 62 of Figs. 3 and 6.

To provide additional lateral support for the stringer wires, to diffuse the loading of the cushion construction and to provide more supporting surface for the breaker or insulating pad, link ties 78 may be used between adjacent stringer wires 16'. In practice the ties 78 are of wire in the form of an elongated loop having the closed end embracing the stringer wire 16' and the ends of the loop return bent and embracing the adjacent stringer wire 16'. To prevent the ties 78 from shifting along the wires 16', kinks 80 may be provided along the wires 16' at the points of attachment of the ties 78. As illustrating a modified arrangement of the loops 48 of Fig. 1, the loops 48' are shown disposed in the supporting surface defined by the wires 16'.

Figs. 11 and 12 show a very similar arrangement of the ties 78 as shown in Fig. 10 except the kinks 80' in the stringer wires 16" are disposed at 90° to the kinks 80 of Fig. 10.

In Figs. 13, 14 and 15 the construction of Fig. 1 has been slightly modified by the addition of the cross wires 82 which are attached at their turned ends 84 to the frame 10 and overlie the stringer wires 16'''. A function of the wires 82 is to diffuse the load over a larger area.

Referring to Figs. 16, 17 and 18, in Fig. 16 the stringer wire 16 is shown removed from the assembly of Figs. 1 and 2. Fig. 17 shows a slightly modified form in which the stringer wire 16a is of plain shape except for the formed portion 86. In Fig. 18 the stringer wire 16b is of plain form except for the supporting end portion.

Having thus described our invention what we claim is novel and desire to secure by Letters Patent is:

1. A spring cushion construction for vehicles comprising first and second border frames, said frames being spaced from each other along at least three corresponding sides, said first frame being the upholstered deflectable loading frame of the construction and said second frame being the fixed supporting frame of the construction, a plurality of parallel arranged stringer wires in the form of lengths of relatively straight wire extending between and attached to a side of said first frame and a spaced opposed portion of one of said frames to present a resilient load carrying surface upon which the upholstery is directly supported, torsion springs each defined by angularly disposed portions converging to a common torsion portion to form a torsion spring of substantially fish mouth shape, said torsion springs being disposed between said side of said first frame and a correspondingly spaced side of said second frame to give resilient support to said stringer wires and said first frame, said angularly disposed portions of said torsion springs diverging to meet said side of said first frame and said correspondingly spaced side of said second frame each said torsion spring and each said stringer wire having a common integral connection with each other through a turned transverse torsion bar portion disposed substantially parallel to said side of said first frame, and means for attaching said torsion bar portion to said first frame directly adjacent thereto to provide a torsion hinge at the point of connection between each stringer wire and each fish mouth torsion spring and said first frame.

2. A spring cushion construction for vehicles comprising first and second border frames, said frames being spaced from each other along at least three corresponding sides, said first frame being the upholstered deflectable loading frame of the construction and said second frame being the fixed supporting frame of the construction, a plurality of parallel arranged stringer wires extending between and attached to a side of said first frame and a spaced opposed portion of one of said frames to present a resilient load carrying surface upon which the upholstery is directly supported, said stringers being defined by relatively straight wire portions for a major part of their length and being of offset U-form for a minor portion of their length, said offset U-form being located adjacent one end of each of said stringer wires, torsion springs each located adjacent the other end of each said stringer wires and each defined by angularly disposed portions converging to a common torsion portion to form a torsion spring of substantially fish mouth shape, said torsion springs being disposed between said side of said first frame and a correspondingly spaced side of said second frame to give resilient support to said stringer wires and said first frame, said angularly disposed portions of said torsion springs diverging to meet said side of said first frame and said correspondingly spaced side of said second frame, each said torsion spring and each said stringer wire having a common integral connection with each other through a turned transverse torsion bar portion disposed substantially parallel to said side of said first frame, and means for attaching said torsion bar portion to said first frame directly adjacent thereto to provide a torsion hinge at the point of connection between each stringer wire and each fish mouth torsion spring and said first frame.

References Cited in the file of this patent

UNITED STATES PATENTS

| | | |
|---|---|---|
| 605,095 | Gardiner | June 7, 1898 |
| 1,430,249 | Morse | Sept. 26, 1922 |
| 2,265,251 | Reed | Dec. 9, 1941 |
| 2,636,544 | Hickman | Apr. 28, 1953 |
| 2,649,897 | Stubnitz | Aug. 25, 1953 |
| 2,764,227 | Williams, et al. | Sept. 25, 1956 |

FOREIGN PATENTS

| | | |
|---|---|---|
| 20,251 | Great Britain | 1889 |
| 768,165 | France | May 14, 1934 |